United States Patent

Poulachon

[11] Patent Number: 5,594,465
[45] Date of Patent: Jan. 14, 1997

[54] DEVICE FOR DYNAMIC DISPLAY OF INFORMATION RELATING TO AN ELECTRONIC SYSTEM OF VARIABLE CONFIGURATION AND/OR COMPOSITION

[75] Inventor: Daniel Poulachon, Les Clayes Sous Bois, France

[73] Assignee: Sextant Avionique, Meudon La Foret, France

[21] Appl. No.: 674,992

[22] Filed: Jul. 3, 1996

Related U.S. Application Data

[63] Continuation of Ser. No. 527,160, Sep. 12, 1995, abandoned, which is a continuation of Ser. No. 395,483, Feb. 27, 1995, abandoned, which is a continuation of Ser. No. 99,832, Jul. 30, 1993, abandoned.

[30] Foreign Application Priority Data

Jul. 31, 1992 [FR] France ................................. 92 09737

[51] Int. Cl.$^6$ ................................................. G09G 3/36
[52] U.S. Cl. ........................................... 345/98; 343/702
[58] Field of Search ................................ 345/98; 343/702; 364/464.02, 464.01; 340/825.44–825.48; 455/343; 358/22

[56] References Cited

U.S. PATENT DOCUMENTS

| | | | |
|---|---|---|---|
| 2,951,163 | 8/1960 | Shaffer et al. | 455/343 X |
| 3,844,840 | 10/1974 | Bender | 455/343 X |
| 4,122,396 | 10/1978 | Grazier et al. | 455/343 |
| 4,422,071 | 12/1983 | deGraaf | 340/825.44 |
| 4,459,585 | 7/1984 | Pasternak | 358/22 |
| 4,711,560 | 12/1987 | Hosaka et al. | . |
| 4,766,295 | 8/1988 | Davis et al. | 364/464.01 |
| 4,888,709 | 12/1989 | Revesz et al. | 340/825.07 |
| 4,918,438 | 4/1990 | Yamasaki | 340/825.46 |
| 4,937,586 | 6/1990 | Stevens et al. | 343/702 |
| 5,012,220 | 4/1991 | Miller | 340/825.44 X |
| 5,020,150 | 5/1991 | Shannon | 455/343 |
| 5,220,681 | 1/1993 | Belgin | 455/343 X |

FOREIGN PATENT DOCUMENTS 0126163 11/1984 European Pat. Off. .
0434921 7/1992 European Pat. Off. .

*Primary Examiner*—Ulysses Weldon
*Attorney, Agent, or Firm*—Browdy and Neimark

[57] ABSTRACT

Device for the dynamic display of information relating to an electronic system of variable configuration and/or composition which uses, on the one hand, an autonomous display module comprising, mounted in a support of small dimensions, a display circuit comprising a display, preferably of the liquid crystal type, driven by a display controller coupled with a status memory and a source of renewable energy connected to the display circuit, and, on the other hand, a means of elaborating, by said system, digital data characterizing it, from both the hardware and software points of view, and a means enabling said data to be transmitted into said status memory, with a view to displaying them on said display. Such a device applies notably to the modular electronics used in aeronautics.

11 Claims, 2 Drawing Sheets

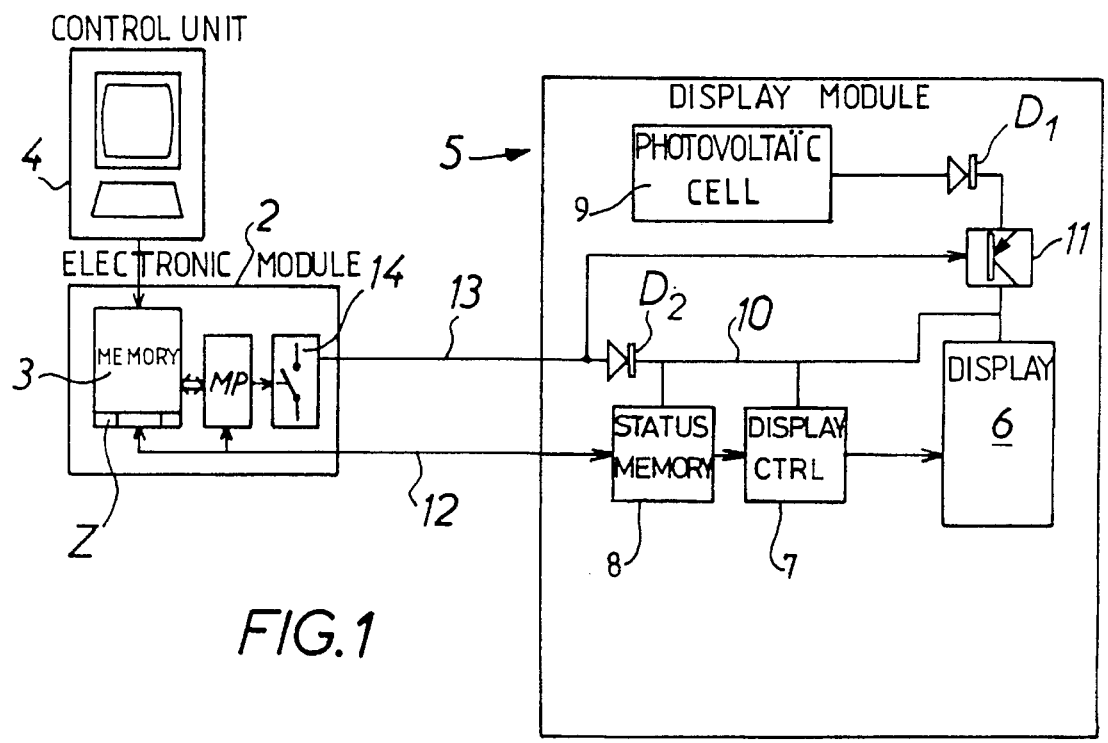

DEVICE FOR DYNAMIC DISPLAY OF INFORMATION RELATING TO AN ELECTRONIC SYSTEM OF VARIABLE CONFIGURATION AND/OR COMPOSITION

This application is a continuation of application Ser. No. 08/527,160 filed Sept. 12, 1995 now abandoned, itself a continuation of Ser. No. 08/395,483 filed Feb. 27, 1995, now abandoned, which itself was a continuation of Ser. No. 08/099,832 filed Jul. 30, 1993, now abandoned.

BACKGROUND OF THE INVENTION

1. Field of the Invention

This invention relates to a device for the dynamic display of information relating to a product such as e.g. an electronic system of variable configuration and/or composition.

2. Description of the Prior Art

In a general manner, the rapid upgrading of hardware and software and the development of numerous versions derived from a same hardware and/or software base have been observed to make the management of products increasingly difficult and costly while multiplying the risks of error.

These problems are particularly acute in the case of modular electronics of which the use is tending to become generalized, notably in aeronautics.

In fact, in this case, the problem not only exists at the level of each of the electronic modules but also at the level of the units housing these different modules.

OBJECT OF THE INVENTION

The main object of this invention is to remedy these problems so as to ensure that all the modules used in a unit and the unit itself can be identified and that, upon each start-up, the compatibility of the functions performed by the modules can be checked and the installation of a new module can be ensured not to have any undesired effect.

SUMMARY OF THE INVENTION

Accordingly, there is provided an autonomous device enabling an automatic displaying of the information relating to a system with which it is associated and an automatic updating of this displaying, without any intervention on the part of the user. This displaying is notably intended to indicate, without any risk of error, the upgrade status of this system from both the hardware and software points of view.

According to the invention, this device uses, on the one hand, an autonomous display module comprising, mounted in a support of small dimensions, a display circuit comprising a display, preferably of the liquid crystal type, driven by a display controller coupled with a status memory, a source of renewable energy connected to the display circuit via a switching circuit, and, on the other hand, a means of elaborating, by said system, digital data characterizing it, on both hardware and software levels, and a means enabling said data to be transmitted into said status memory, with a view to displaying them on said display.

Advantageously, the above-mentioned system is designed so as to transmit the above-mentioned data to the status memory every time it undergoes a downloading operation, these data being further updated every time the system hardware is modified. In this case, the device embodying the invention can further comprise a switching means enabling the autonomous module to be only powered during the downloading phases.

Furthermore, the above-mentioned autonomous module can have complementary functions such as e.g. the counting of the time the system is in use.

In this case, the module can comprise a detector of the presence of serviceable voltage in the system and a counter designed so as to count the pulses of a clock, throughout the time said detector detects the presence of said voltage.

According to another particularity of the invention, in the case of the system comprising plural removable electronic modules, each of the modules can comprise a respective local display module. In this case, these different local modules can be connected to a central display module specific to the entire system comprising a means for scanning the status memories of the different local modules and a microprocessor-managed table of correspondence enabling system identification information to be deduced as a function of the combination of data recorded in the status memories of the local modules. Working from this table of correspondence, the microprocessor can, of course, detect failures and, in particular, invalid configurations.

BRIEF DESCRIPTION OF THE DRAWINGS

Further features and advantages of the invention will be described hereinafter, by way of non limiting examples, in reference to the accompanying drawings in which:

FIG. 1 is a synoptic diagram illustrating the principle of the display device embodying the invention;

FIG. 2 is a schematic representation of a computer whose structure is in the form of a rack in which three computation modules are engaged, in drawer-like fashion;

FIG. 3 is a synoptic diagram illustrating a mode of connection, via a configuration bus, of the display modules associated with the computation modules and with the structure of the computer represented in FIG. 2.

DESCRIPTION OF THE PREFERRED EMBODIMENTS

Figure 4:
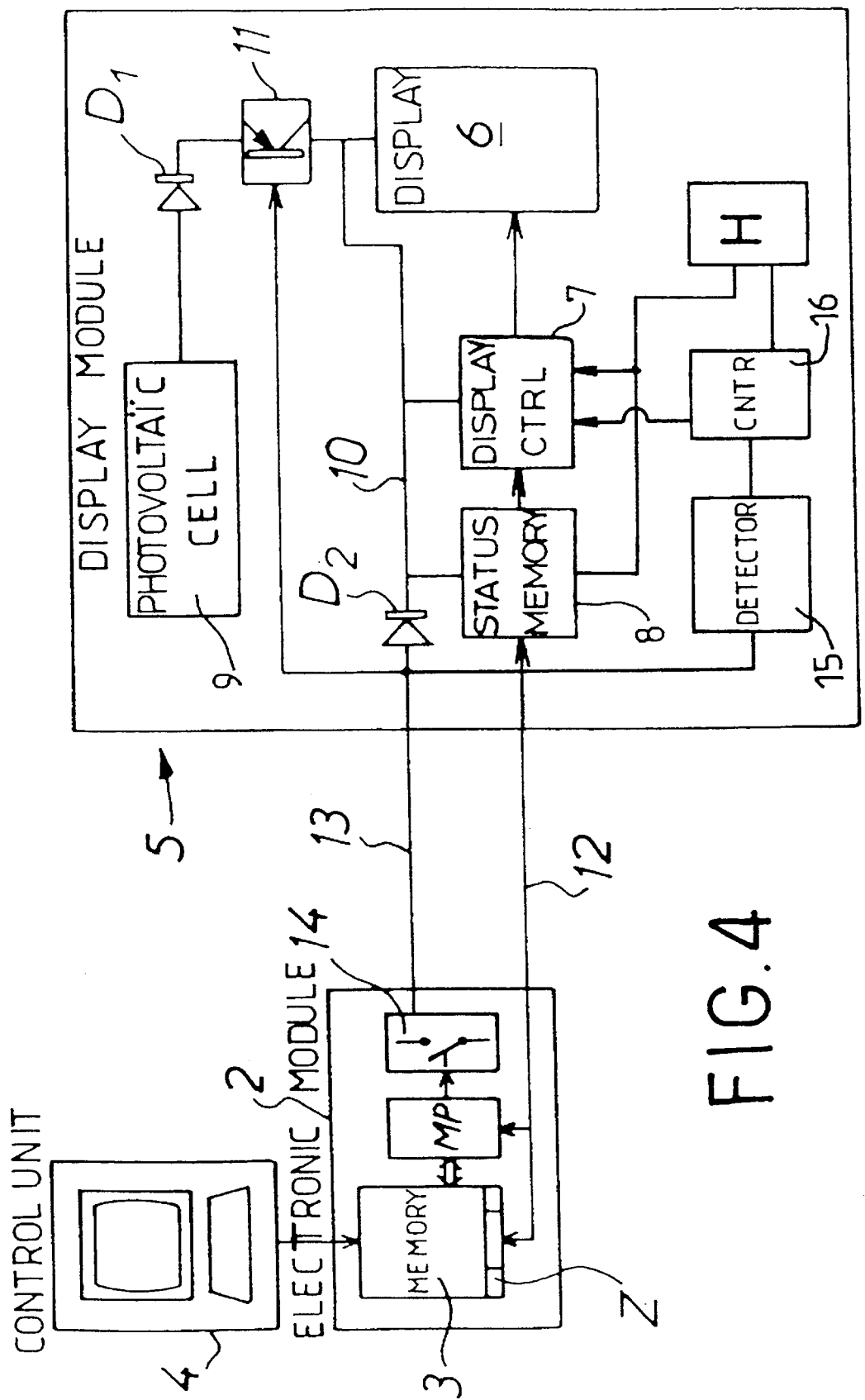
FIG. 4 is a synoptic diagram of the display device according to another embodiment of the invention.

The display device, illustrated in FIG. 1, equips an electronic module, schematically represented by block 2, whose memory 3 can be downloaded by an application program by means of a control unit 4 schematically represented by a keyboard/screen console.

This display device uses a display module 5 mounted in a flat support permanently attached to the case of the electronic module 2.

The dimensions and functions of this display module are such that it can be assimilated with a label intended to receive the identification data of the electronic module.

For this purpose, the display module 5 comprises a liquid crystal type display 6 driven in a conventional manner by a display controller 7.

This display controller 7 is itself connected to a status memory 8, e.g. of the EEPROM type or similar, in which the data relating to the identification of the electronic module 2 can be memorized or saved, even in the event of a power cutoff, with a view to being displayed on the display 6.

For the purposes of ensuring the autonomy of its energy, the display module 5 comprises a photovoltaic cell 9 connected to the feed circuit 10 of the display 6, controller 7 and memory 8 via a diode $D_1$ and an electrically controllable circuit breaker 11 (schematically represented by a transistor) whose role will be described hereinafter.

The connections between the display module 5 and the electronic module 2 use, on the one hand, a two-way link 12 between the status memory 8 and the microprocessor MP associated with the status memory 8 of the electronic module 2 to be controlled, and, on the other hand, a feed circuit 13 connecting the feed circuit 10 of the display module 5 to the feed circuit of the electronic module 2, via a switch 14 inside the module 2, controlled by the microprocessor MP and a diode $D_2$ inside the module 5.

The operating of the device previously described will then be as follows:

When the memory 3 of the electronic module 2 is downloaded by the processor 4, the switch 14 is commanded so as to ensure the connection of the feed circuit of the electronic module 2 with the display module 5, via the diode $D_2$. The presence of the serviceable voltage at input of the diode $D_2$ then causes a switching of the circuit breaker 11 which isolates the photovoltaic cell 9 of the feed circuit 10 of the module 5.

During the downloading, (preferably at the end), the processor 4 triggers a transfer routine, into the status memory 8, of the identification data of the electronic module 2 and of the application program concerned by the downloading, which are at the end of the downloading contained in predetermined zones Z of the memory space allocated to the module 2.

The data transfer routine can also be triggered every time the hardware configuration of the electronic module 2 is modified, in which case the data relating to these hardware configurations can be contained in programmable memories associated with each of the interchangeable elements of the electronic module 2 and which are part of the memory space allocated to this electronic module 2.

In practice, the display controller 7 uses a small-sized microprocessor associated with a clock circuit.

It is clear that such a structure (microprocessor-memory-display) can be used to provide other services.

In this way, e.g. this structure can count the time the electronic module 2 is in use and can comprise, as represented in FIG. 4:

- a detector 15 of the presence of the serviceable voltage to the electronic module 2,
- a counter 16 capable of counting pulses supplied by the clock H associated with the microprocessor, this counter 16 being triggered by the detector 15 when the detector signals the presence of the serviceable voltage, and
- a possible means of conversion (not represented) enabling a display in days, hours and minutes of the contents of the counter.

The detection of the presence of the serviceable voltage to the electronic module 2 can be performed by the feed circuit 12, absence of voltage in this circuit 12 meaning stoppage of said module.

This detection could, of course, use an additional electrical link between modules 2 and 5.

The invention is not limited to the embodiment previously described. The display module can thus be not only associated with electronic modules such as computers, but also with component or accessory elements of the latter, such as electronic boards, memory modules, etc.

FIG. 2 shows a method of applying the invention to a computer 20 in the form of a rack in which interchangeable electronic modules $M_1$, $M_2$, $M_3$ engage in drawer-like fashion.

In this example, each of the electronic modules $M_1$, $M_2$, $M_3$ has, on its front side, a display module 5 such as the one previously described.

Likewise, the computer 20 comprises, mounted on its front side, a display module 21 of similar structure to that of modules 5, but whose role consists in indicating the configuration of the computer 20 as a function of type of the electronic modules $M_1$, $M_2$, $M_3$ connected to it, and to check that this configuration is authorized prior to start-up.

This display module 21 can comprise, as indicated in FIG. 3, a display 22 whose display controller 23 is connected to two memories 24, 25 destined to respectively contain, on the one hand, in respect of the memory 24, the identification data contained in the status memories of the display modules 5 associated with the electronic modules $M_1$, $M_2$, $M_3$, and, on the other hand, in respect of the memory 25, the identification data of the hardware and/or software permanently installed in the rack of the computer 20.

The data transfers between these memories 24, 25 and the status memories 8 of the modules 5 are managed by the microprocessor M2P of the display module 21 which permanently scans the status memories of the labels and which, by means of a table of correspondence, determines the configuration of the computer 20 as a function of the software and hardware identification data of all the modules $M_1$, $M_2$, $M_3$. This determination can be carried out in a conventional manner by searching for the coinciding of a status word of the modules with a configuration word in the table.

The link between the electronic modules $M_1$, $M_2$, $M_3$ is performed e.g. by means of a serial type configuration bus.

Of course, in the case of the configuration determined by the microprocessor M2P from the data contained in the display modules 5 being absent from the table of correspondence 26 or deemed forbidden, the microprocessor M2P then commands the displaying of an error message.

In the case of an incomplete configuration, the microprocessor M2P can also indicate the references of the missing module.

The device previously described applies particularly advantageously to the on-board computers in aircraft. In this case, it can indicate the abbreviated name of the computer and its hardware and software upgrade status.

It can further apply to the displaying of the hardware and software references of memory modules devoid of an integrated processor but connected to the latter by an electrical interface.

I claim:

1. A device for the dynamic display of information relating to an electronic system comprising a plurality of removable electronic modules, said device comprising:

a plurality of local display modules each being connected to a respective electronic module, each local display module comprising, mounted in a support of small dimensions, a display circuit comprising a display driven by a display controller connected to a status memory for displaying on said display digital data stored in said status memory, and a source of renewable energy connected to the display circuit, said digital data relating to hardware and software configuration of the associated electronic module, and a central display module connected to said system and connected to said local display modules, said central display module comprising means for scanning the status memories of said different local modules, and a microprocessor-managed table of correspondence enabling system identification information to be deduced as a function of the combination of data recorded in the status memories of said local display modules, each electronic module comprising:

means for elaborating digital data characterizing hardware and software of said electronic module every time said hardware is modified, and means for transmitting said data into the status memory of the local module connected to said electronic module every time a memory of the electronic module undergoes a downloading operation, said elaborating means being connected through transmitting means to the status memory of the local module connected to said electronic module.

2. The device as claimed in claim 1, wherein the status memory of each of said display modules is of the EEPROM type which saves the data recorded even in the event of a cutoff of the power to said display module.

3. The device as claimed in claim 1, wherein said source of renewable energy consists in a photovoltaic cell.

4. The device as claimed in claim 1, wherein each display module comprises counting means for counting the time the associated electronic module is in use, said counting means being connected to a feed circuit of said associated electronic module, for detecting when the associated electronic module is in use.

5. The device as claimed in claim 4, wherein said counting means comprises a detector of the presence of serviceable voltage in said associated electronic module and a counter designed so as to count the pulses of a clock, throughout the time said detector detects the presence of said voltage.

6. A device for the dynamic display of information relating to an electronic system comprising a plurality of removable electronic modules, said device comprising:

a plurality of local display modules each being connected to a respective electronic module, each local display module comprising, mounted in a support of small dimensions, a display circuit comprising a display driven by a display controller connected to a status memory for displaying on said display digital data stored in said status memory, and a source of renewable energy connected to the display circuit, said digital data relating to hardware and software configuration of the associated electronic module, and a central display module connected to said system and connected to said local display modules, said central display module comprising means for scanning the status memories of said different local modules, and a microprocessor-managed table of correspondence enabling system identification information to be deduced as a function of the combination of data recorded in the status memories of said local display modules, said table of correspondence being designed so as to detect problems with the compositions and configurations of said system, each electronic module comprising:

means for elaborating digital data characterizing hardware and software of said electronic module every time said hardware is modified, and means for transmitting said data into the status memory of the local module connected to said electronic module every time a memory of the electronic module undergoes a downloading operation, said elaborating means being connected through transmitting means to the status memory of the local module connected to said electronic module.

7. A single autonomous display module which dynamically displays information identifying hardware configuration and software configuration of an electronic apparatus, apparatus having interchangeable electronic circuit boards, a processor and an apparatus memory for storing programs, and being housed in a housing, said processor also having:

means for locating in memories of said electronic circuit boards first digital identification data identifying each of said electronic circuit board every time one of said electronic circuit boards is modified;

means for locating in said apparatus memory second digital identification data identifying programs stored in the apparatus memory every time the memory of said apparatus undergoes a program downloading operation; and means for transmitting said first and second digital identification data from said apparatus memory and said electronic circuit boards memories through an output line every time said first and second digital identification data are determined;

said single autonomous display module comprising:

a casing of dimensions smaller than said housing;

means for fixing said casing on said housing of said apparatus;

a display of the liquid crystal type;

a status memory disposed within said casing;

a display circuit disposed within said casing and comprising a display controller connected to said display and to said status memory for displaying, on said display, data stored in said status memory;

a source of renewable energy connected to the display circuit; and means for coupling said status memory to said output line.

8. The device as claimed in claim 7, wherein said status memory is of the EEPROM type which saves the data recorded even in the event of a cutoff of the power to said display module.

9. The device as claimed in claim 7, wherein said source of renewable energy consists in a photovoltaic cell.

10. The device as claimed in claim 5, further comprising counting means for counting the time the system is in use, said counting means being connected to a feed circuit of said system, for detecting when the system is in use.

11. The device as claimed in claim 10, wherein said counting means comprises a detector of the presence of serviceable voltage in said system and a counter designed so as to count the pulses of a clock, throughout the time said detector detects the presence of said voltage.

* * * * *